United States Patent [19]

Hotsumi et al.

[11] Patent Number: 5,251,771
[45] Date of Patent: Oct. 12, 1993

[54] STRUCTURE OF A CASING FOR A VEHICLE-MOUNTED RADIO COMMUNICATION APPARATUS

[75] Inventors: Minoru Hotsumi, Tokyo; Hiroshi Yoshida, Saitama, both of Japan

[73] Assignee: NEC Corporation, Tokyo, Japan

[21] Appl. No.: 953,245

[22] Filed: Sep. 30, 1992

[30] Foreign Application Priority Data

Oct. 1, 1991 [JP] Japan ............................ 3-079631[U]

[51] Int. Cl.⁵ ............................................ B65D 51/18
[52] U.S. Cl. .................................. 220/4.01; 220/241; 220/326
[58] Field of Search .................. 220/241, 324, 4.01, 220/326, 306, 307

[56] References Cited

U.S. PATENT DOCUMENTS

| | | | |
|---|---|---|---|
| 1,952,719 | 3/1934 | Lenin | 220/241 |
| 3,979,016 | 9/1976 | Frater | 220/324 |
| 4,149,741 | 4/1979 | Lipscomb et al. | 220/324 |
| 4,582,219 | 4/1986 | Mortenson et al. | 220/324 |
| 4,593,813 | 6/1986 | Polzl | 220/324 |
| 4,709,834 | 12/1987 | Mortenson | 220/324 |
| 4,874,110 | 10/1989 | Klein et al. | 220/241 |

*Primary Examiner*—Joseph Man-Fu Moy
*Attorney, Agent, or Firm*—Burns, Doane, Swecker & Mathis

[57] ABSTRACT

A structure of a casing for a vehicle-mounted radio communication apparatus. The casing is removably mounted on a fixture in any one of a plurality of positions such that either the surface or the back thereof rests on the fixture, as desired. This allows cables to be readily connected to associated connectors provided on the casing.

4 Claims, 9 Drawing Sheets

STRUCTURE OF A CASING FOR A VEHICLE-MOUNTED RADIO COMMUNICATION APPARATUS

BACKGROUND OF THE INVENTION

The present invention relates to a mobile radio communication apparatus and, more particularly, to the structure of a casing for a vehicle-mounted radio communication apparatus.

Mobile radio communication apparatuses extensively used today include one which is mounted on a vehicle, e.g., automobile. It is a common practice with a vehicle-mounted or on-board radio communication apparatus to provide the casing thereof with a connector for power supply, an RF (Radio Frequency) connector, IF (Intermediate Frequency) connector, modular connector, etc. Cables are each connected to associated one of such connectors. The casing has a surface and a back definitely distinguished from each other and is fixedly connected to a fixture at the back thereof at all times. The fixture is affixed to a predetermined position inside the vehicle cabin readily accessible by the operator. The prerequisite with this kind of casing structure is that the fixture be affixed to the vehicle body and the casing be affixed to the fixture in such a manner as to promote easy connection of the cables and associated connectors.

The conventional casing has a problem that it has to be connected to the fixture in either of only two positions since the back of the casing is connected to the fixture at all times, i.e., the surface of the casing always faces upward. The two positions are one in which the front and rear edges of the casing face forward and rearward, respectively and one obtainable by rotating the casing 180 degrees from such a position. With only such two positions, it is difficult to set up a desirable positional relation which would facilitate the connection of the cables and connectors.

SUMMARY OF THE INVENTION

It is therefore an object of the present invention to provide a structure of a casing for a vehicle-mounted radio communication apparatus which promotes easy connection of cables to associated connectors provided on the casing.

In accordance with the present invention, in a structure of a rectangular parallelepiped box-like casing to be removably affixed to a flat rectangular fixture, the fixture comprises at least first and second positioning members provided on the bottom of the fixture, first and second locking members adjoining a first side edge of the fixture, and a third locking member adjoining a second side edge of the fixture facing the first side edge. The casing comprises third and fourth positioning members provided on a surface of the casing and positioned by, respectively, the first and second positioning members of the fixture, fifth and sixth positioning members provided on the back of the casing and positioned by, respectively, the first and second positioning members of the fixture, third and fourth locking members provided on a first side of the casing and locked by, respectively, the first and second locking members of the fixture when the rear of the casing is connected to the fixture, and fifth and sixth locking members provided on the first side of the casing symmetrically with the third and fourth locking members with respect to the longitudinal center line of the first side and locked by, respectively, the first and second locking members of the fixture when the surface of the casing is connected to the fixture.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, a brief reference will be made to a conventional casing structure of a vehicle-mounted radio communication apparatus, shown in FIGS. 1A and 1B. As shown, the casing structure is generally made up of a fixture 100 and a casing 200. The casing 100 has a surface S and a back B definitely distinguished from each other. The back B is connected to the fixture 100 at all times while the surface S is positioned to face upward at all times. The fixture 100 is provided with holes 101-104 through which screws may be passed for fixing the fixture 100 in a predetermined position inside the vehicle cabin, lugs 105 and 106 for positioning the casing 200, hook members 107 and 108 engageable with the casing 200, and a latch member 109 biased by a spring 109a for latching the casing 200. The lugs 105 and 106 mate with recesses, not shown, formed in the back B of the casing 200 to position the casing 200 relative to the fixture 100. The casing 200 has a first side S1 formed with recesses 201 and 202 which mate respectively with the hook members 107 and 108 of the fixture 100, and a second side S2 formed with a recess 203 which mates with the biased latch member 109 of the fixture 100. The casing 200 is provided with a power supply connector 204, an RF connector 205 and a recess 206 for a T/P coupler at the front F thereof, and an IF connector 207, a modular connector 208, and an earphone jack 209 at the rear R thereof.

Figure 1A:
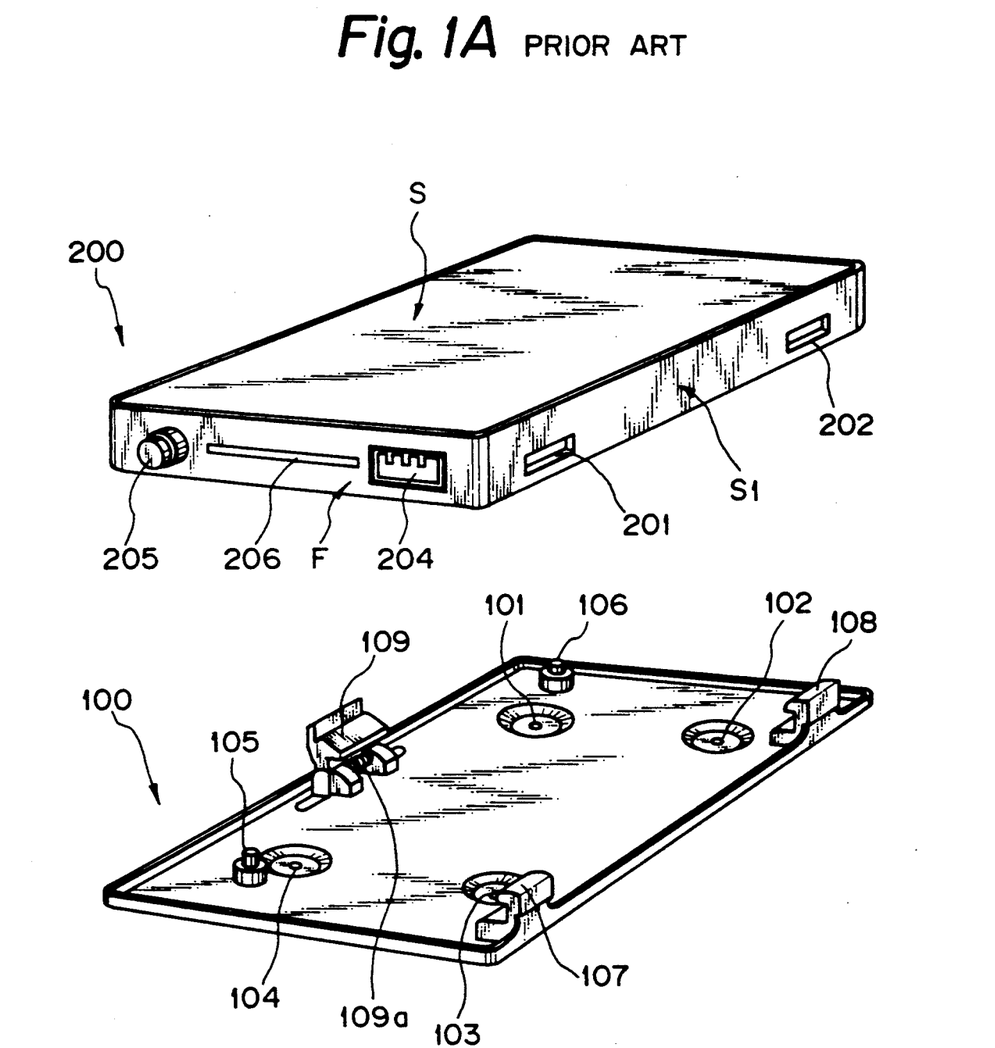
FIGS. 1A and 1B are exploded perspective views of a casing included in a conventional vehicle-mounted radio communication apparatus.
Figure 1B:
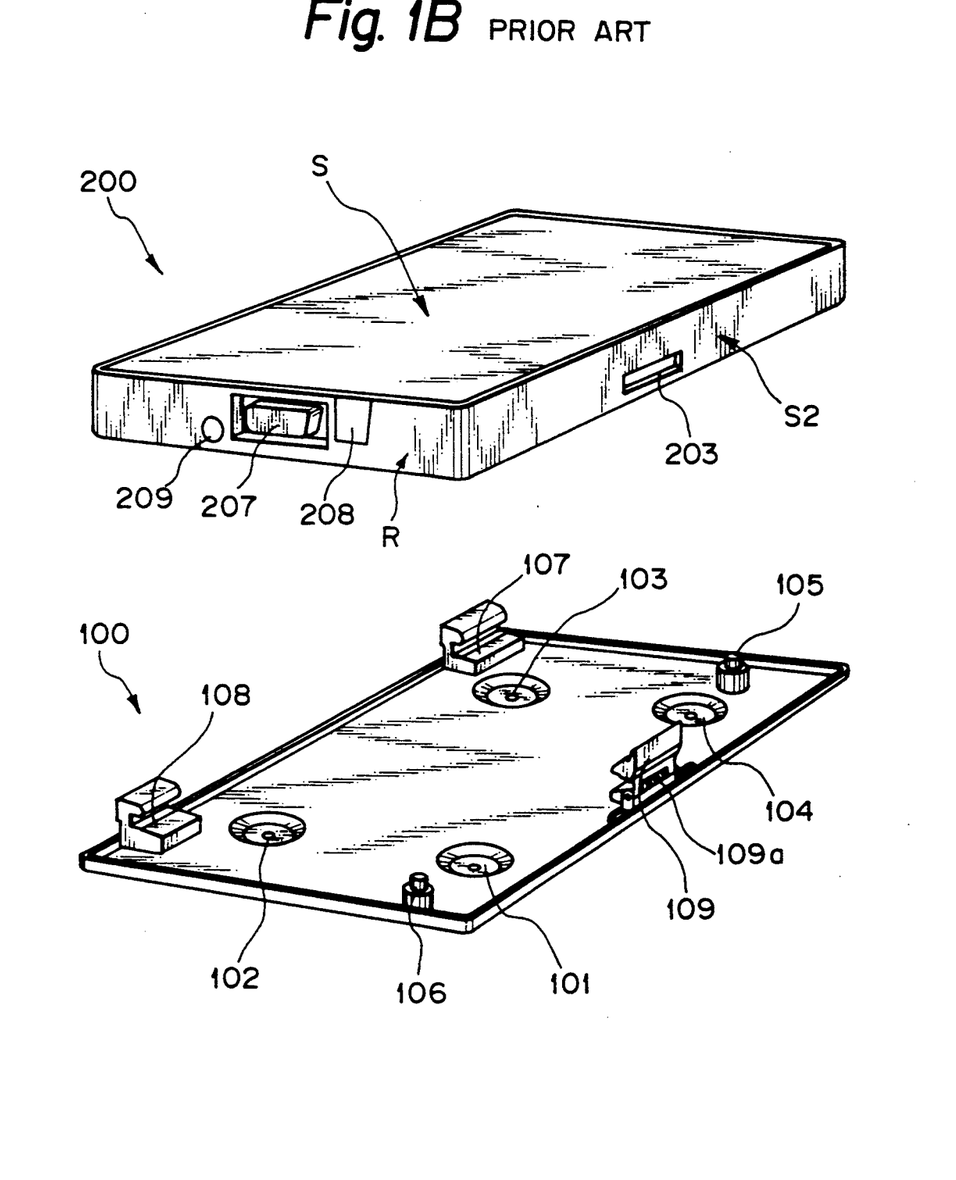
Figure 2A:
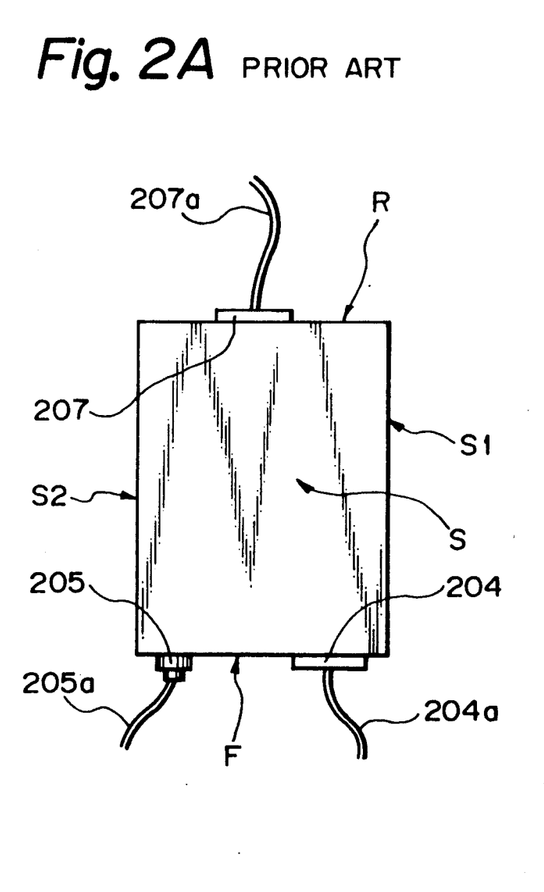
FIGS. 2A and 2B are plan views associated with respectively, FIGS. 1A and 1B, each showing the casing mounted on a vehicle body.
Figure 2B:
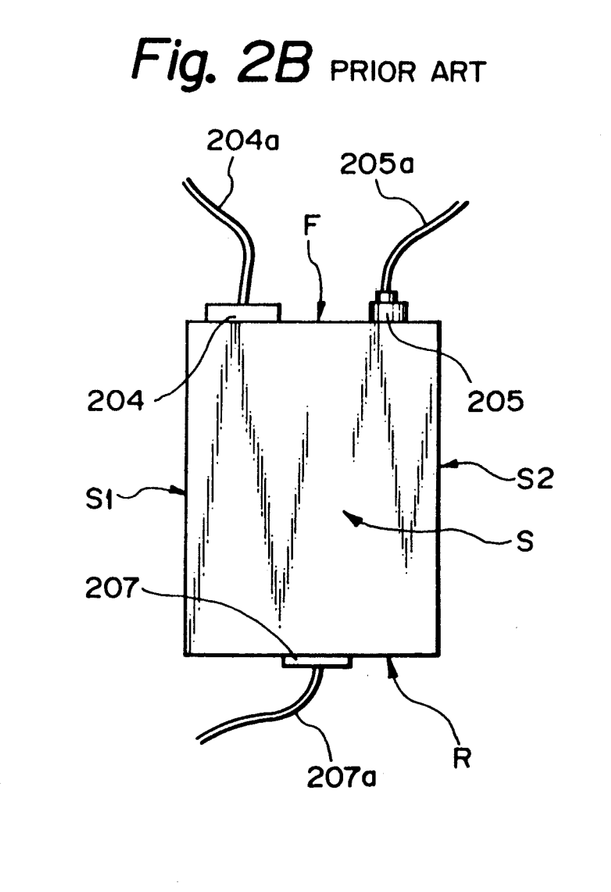

The casing 200 oriented as shown in FIG. 1A is connected to the fixture 100 and mounted on the vehicle body in the positional relation shown in FIG. 2A. The casing 200 in the position shown in FIG. 2A is mounted on the vehicle body in the positional relation shown in FIG. 2B. In this manner, the conventional casing 200 is connectable to the vehicle body in either of only two positions since the back B of the casing 200 is fixedly connected to the fixture 100 at all times. In FIGS. 2A and 2B, labeled 204a, 205a and 207a are cables connected to the connectors 204, 205 and 207, respectively.

A reference will be made to FIGS. 3A-3D and 4A-4D for describing a casing structure embodying the present invention. In the figures, the same or similar constituents to those shown in FIGS. 1A-2B are designated by the same reference numerals. Briefly, a casing which will be described is removably mounted on a fixture.

Figure 3A:
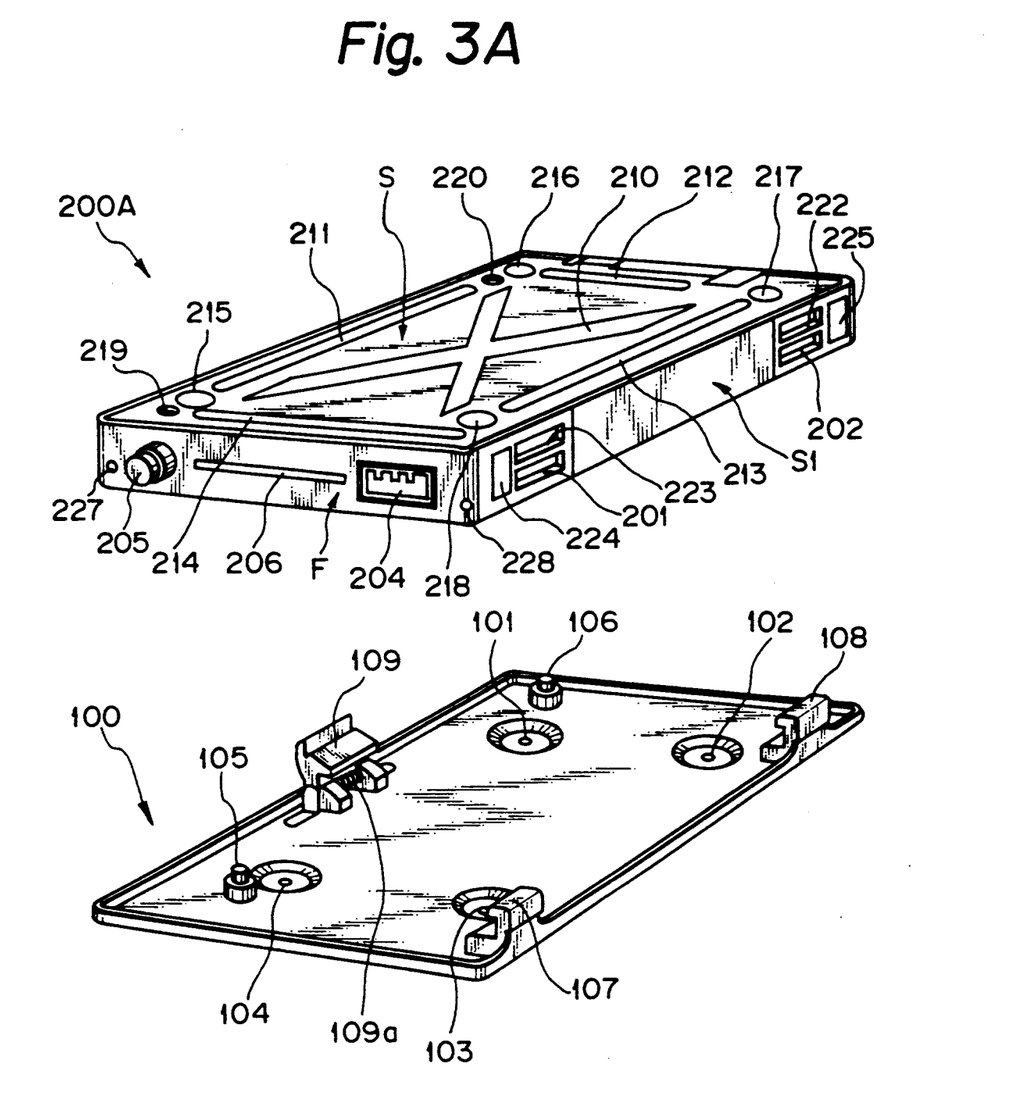
FIGS. 3A-3D are exploded perspective views showing a casing embodying the present invention.
Figure 3B:
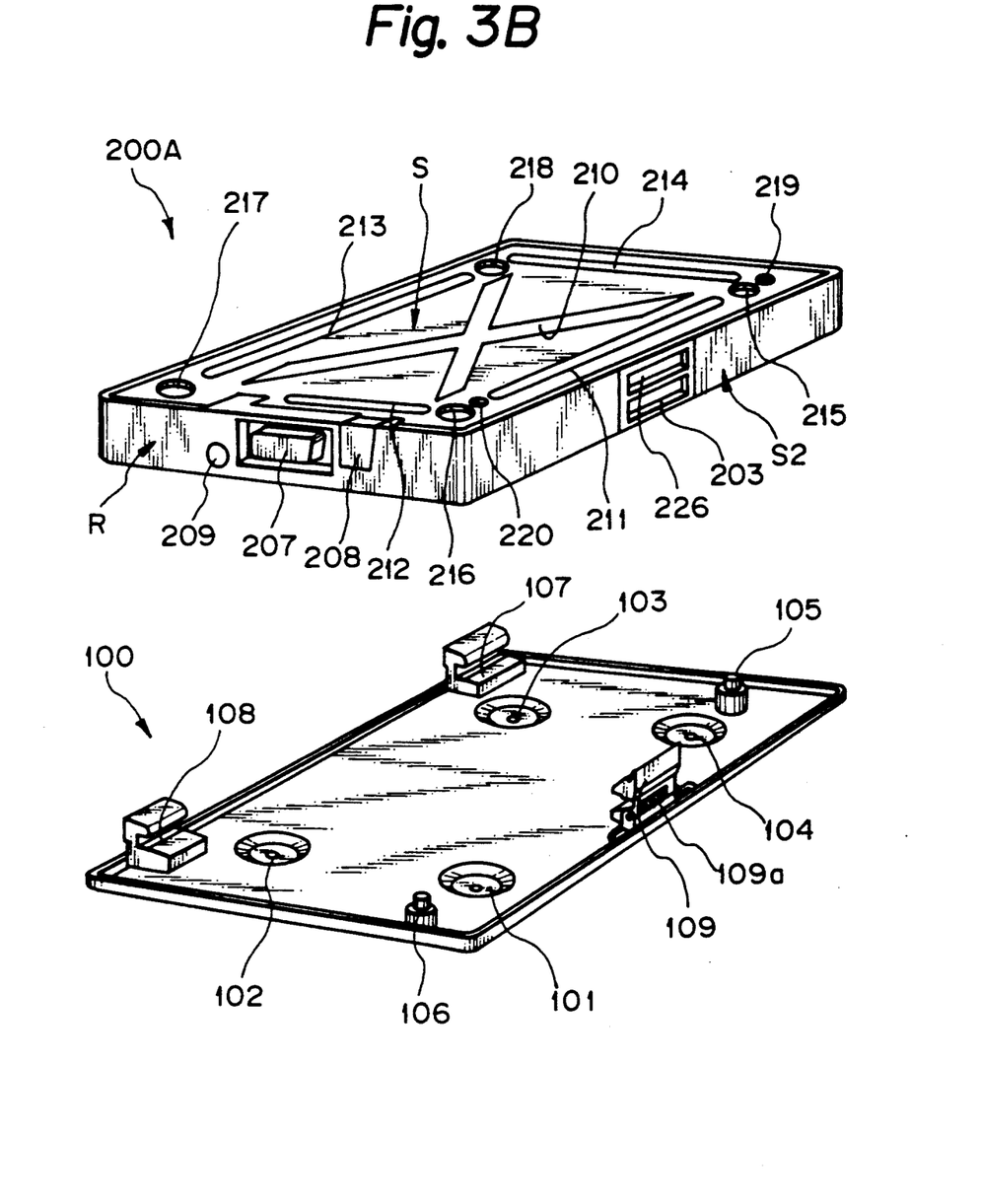
Figure 3C:
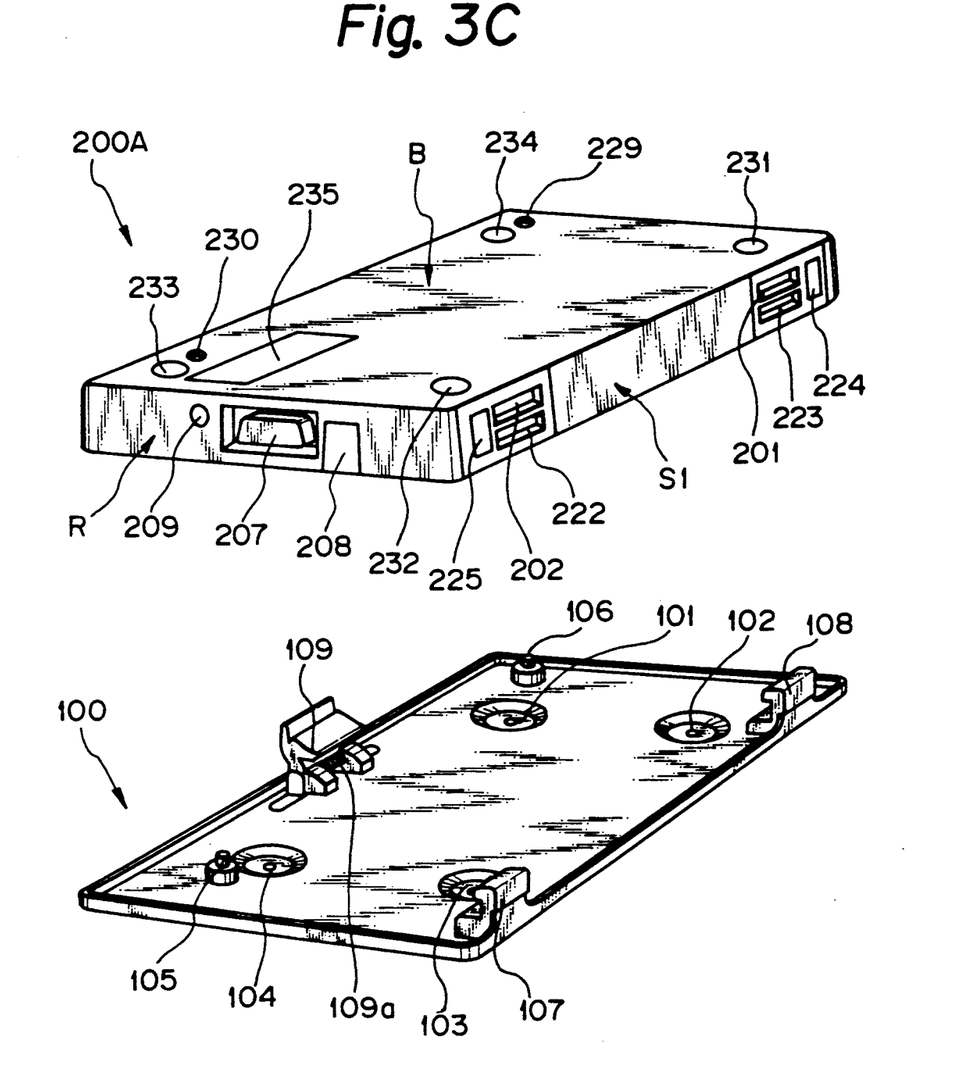
Figure 3D:
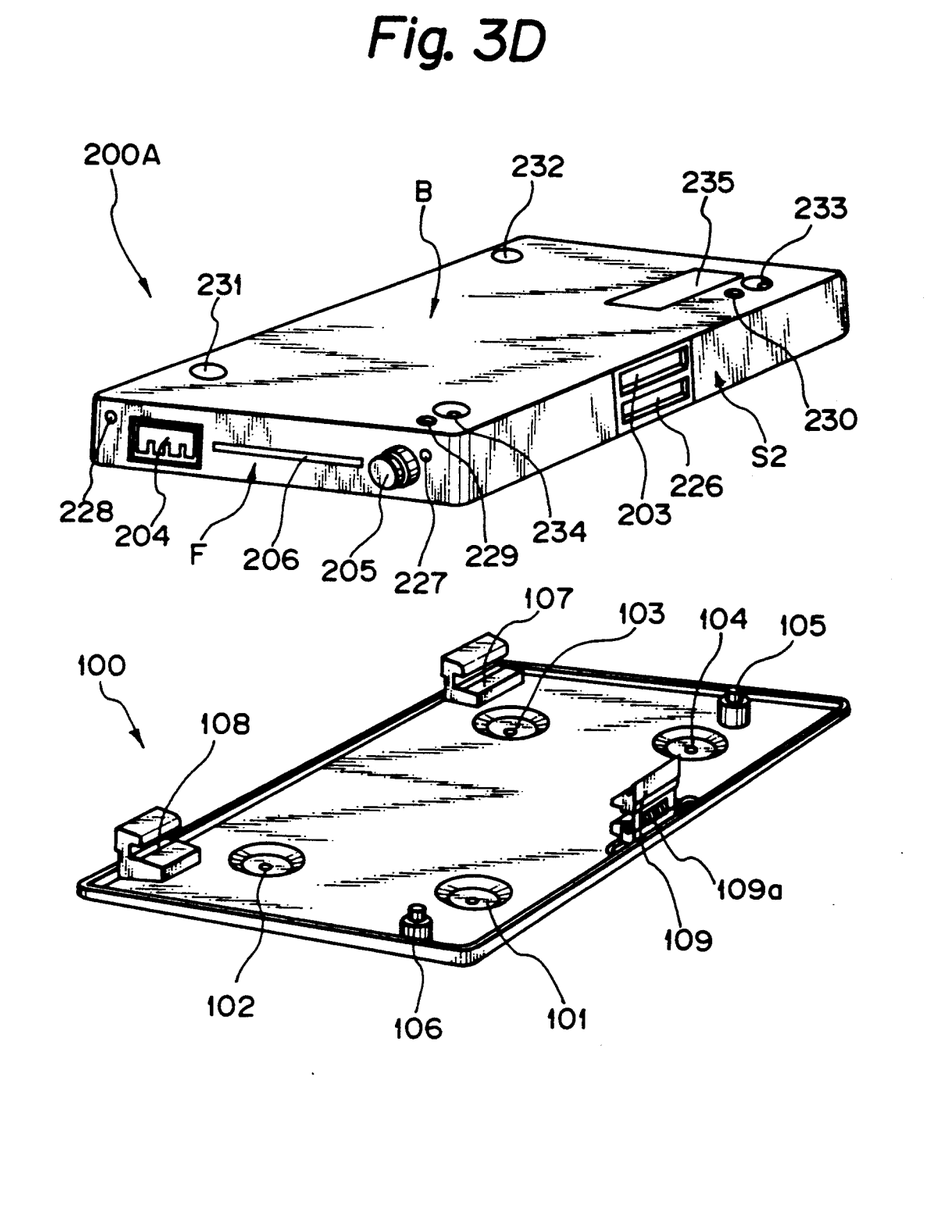

Specifically, as shown in FIGS. 3A-3D, a fixture 100 has a flat configuration similar to that of the conventional fixture 100 while a casing 200A has a unique configuration, as will be described. The casing 200A is provided with a rectangular parallelepiped box-like configuration by die casing. The casing 200A has on the surface S thereof recesses 210-214 formed by contraction for reinforcement, legs 215-218 made of rubber, and positioning recesses 219 and 220 which mate with, respectively, lugs 106 and 105 protruding from the fixture 100. Further, as shown in FIGS. 3A and 3C, the casing 200A has on a first side S1 thereof first recesses 201 and 202 for mating respectively with hook members 107 and 108 provided on the fixture 100 as in the conventional structure, and second recesses 223 and 222 symmetrical with the recesses 201 and 202 with respect to the longitudinal center line of the side S1 and which are also engageable with the hook members 107 and 108, respectively. Legs 224 and 225 are made of rubber and provided on the first side S1 of the casing 200A. On the other hand, as shown in FIGS. 3B and 3D, the casing 200A has on second side S2 thereof a first recess 203 for mating with a latch member 109 provided on the fixture 100 and similar to the latch member 109 of the conventional casing 200. In addition, a second recess 226 for also mating with the latch member 109 is provided on the second side S2 symmetrically with the first recess 203 with respect to the longitudinal center line of the side S2.

As shown in FIGS. 3A and 3D, recesses 227 and 228 for a T/P coupler are formed in the front F of the casing 200A in addition to a power supply connector 204, an RF connector 205 and a recess 206 for a T/P coupler which are conventional. As shown in FIGS. 3C and 3D, the casing 200A has on the back B thereof positioning recesses 229 and 230 engageable with, respectively, lugs 105 and 106 provided on the fixture 100, legs 231-234 made of rubber, and a nameplate 235.

Figure 4A:
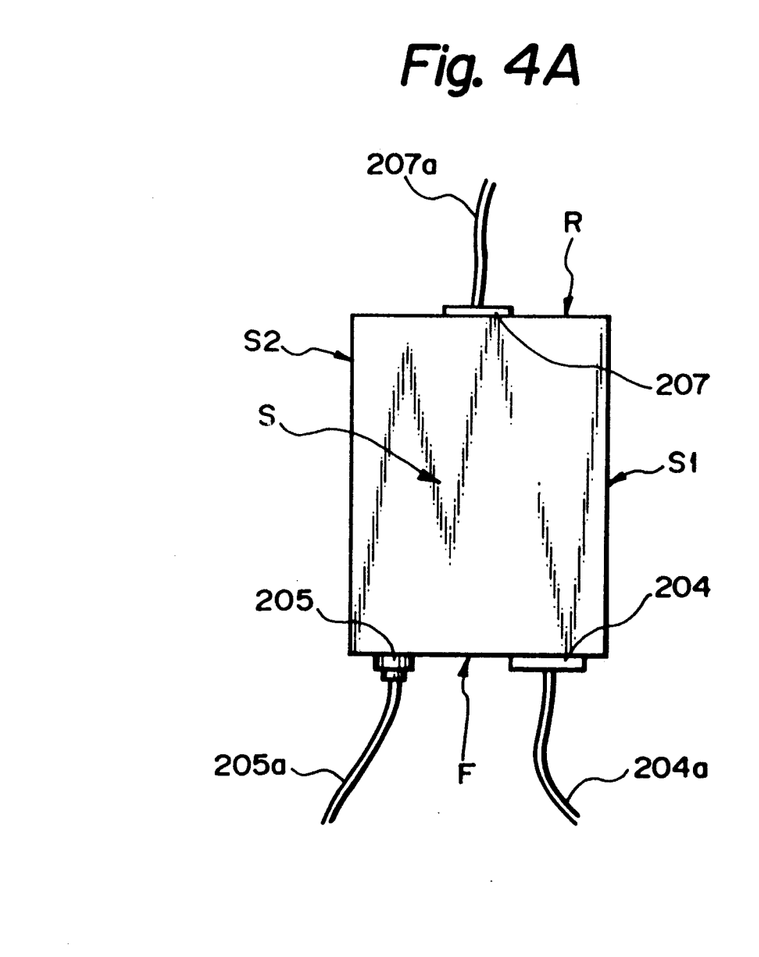
FIGS. 4A-4D are plan views associated with FIGS. 3A-3D, respectively, each showing the casing mounted on a vehicle body.
Figure 4B:
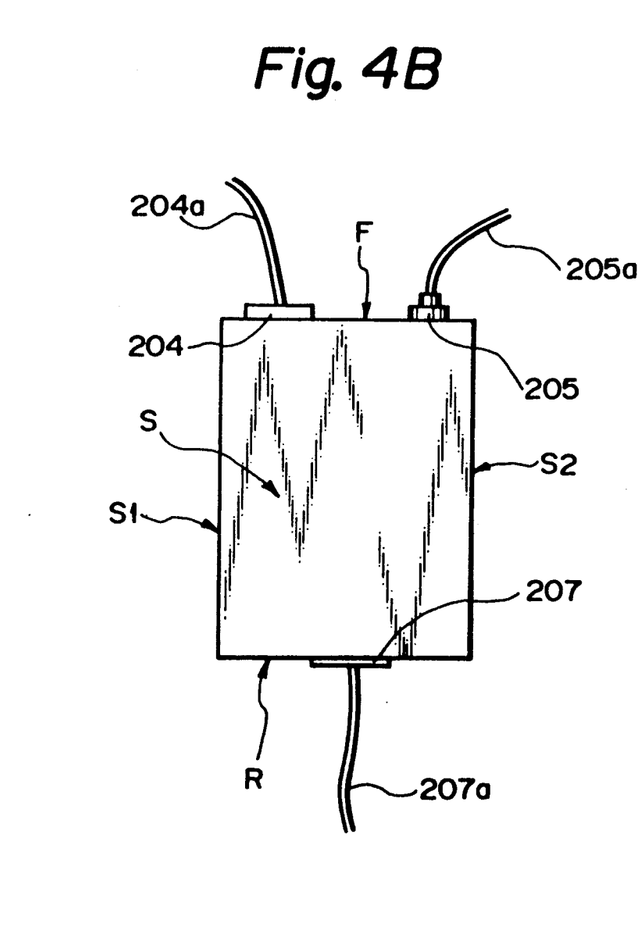
Figure 4C:
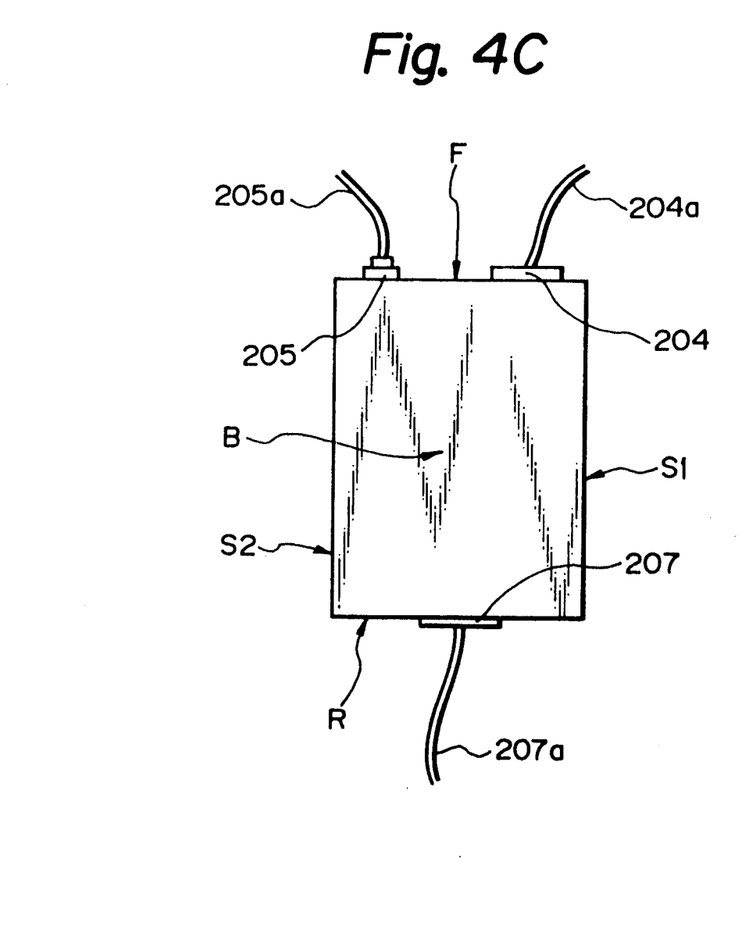
Figure 4D:
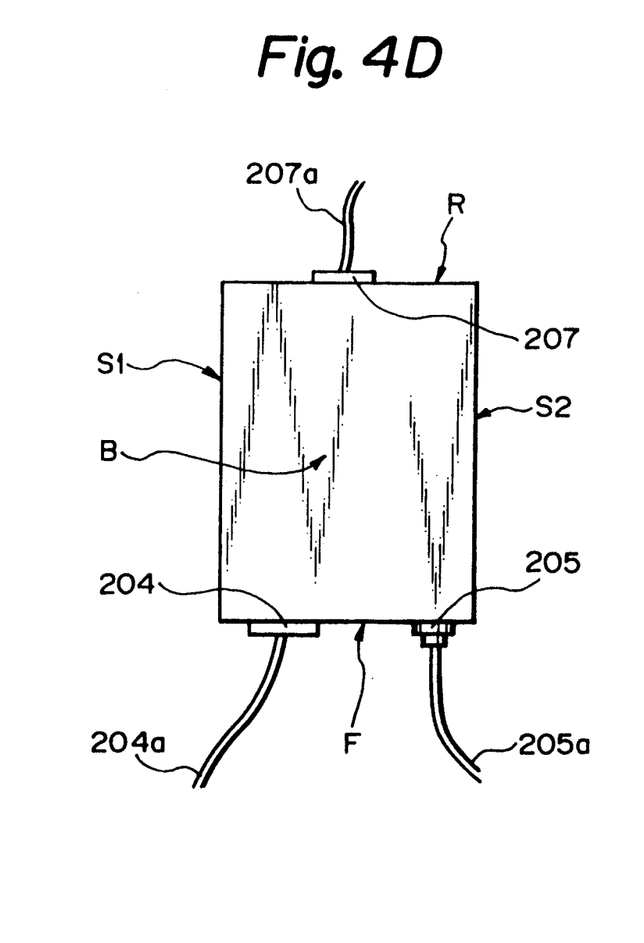

The casing 200A positioned as shown in FIG. 3A is connected to the fixture 100 and, therefore, to the vehicle body in the positional relation shown in FIG. 4A. Likewise, the casing 200A is mounted on the vehicle body in the positional relation of FIG. 4B when connected to the fixture 100 positioned as shown in FIG. 3B, in the positional relation of FIG. 4C when connected to the fixture 100 positioned as shown in FIG. 3C, or in the positional relation of FIG. 4D when connected to the fixture 100 positioned as shown in FIG. 3D. In the embodiment, therefore, the casing 200A can be mounted on the vehicle body in any one of four positions in total. This is because not only the back B of the casing 200A, like that of the conventional casing 200, can selectively assume one of two positions, but also the surface S of the casing 200A can also selectively assume one of two positions. As a result, as shown in FIGS. 4A-4D, it is possible to affix the casing 200A or fixture 100 to the vehicle body in an optimal position for easy connection of the connectors 204, 205 and 207 provided on the casing 200A and the associated cables 204a, 205a and 207a.

Various modifications will become possible for those skilled in the art after receiving the teachings of the present disclosure without departing from the scope thereof.

What is claimed is:

1. In a structure of a rectangular parallelepiped box-like casing to be removably affixed to a flat rectangular fixture, said fixture comprising:
   at least first and second positioning means provided on a bottom of said fixture;
   first and second locking means adjoining a first side edge of said fixture; and
   third locking means adjoining a second side edge of said fixture facing said first side edge;
   said casing comprising:
   third and fourth positioning means provided on a surface of said casing and positioned by, respectively, said first and second positioning means of said fixture;
   fifth and sixth positioning means provided on a back of said casing and positioned by, respectively, said first and second positioning means of said fixture;
   third and fourth locking means provided on a first side of said casing and locked by, respectively, said first and second locking means of said fixture, when the rear of said casing is connected to said fixture; and
   fifth and sixth locking means provided on the first side of said casing symmetrically with said third and fourth locking means with respect to a longitudinal center line of said first side and locked by, respectively, said first and second locking means of said fixture when the surface of said casing is connected to said fixture.

2. A structure as claimed in claim 1, wherein said first and second positioning means each comprises a lug provided on the bottom of said fixture, said third to sixth positioning means each comprising a recess formed in a wall portion of either of the surface and the back of said casing.

3. A structure as claimed in claim 1, wherein said first and second locking means each comprises a hook member adjoining the first side edge of said fixture and having a projection, said third to sixth locking means each comprising a recess adjoining the wall portion of the first side of said casing and engageable with one of the projections of said hook members.

4. A structure as claimed in claim 1, wherein said third locking means adjoining the second side edge of said fixture comprises a latch, said fifth and sixth locking means each comprising a recess provided in the wall portion of the first side of said casing.

* * * * *